United States Patent
Zhang et al.

(10) Patent No.: US 12,231,227 B2
(45) Date of Patent: Feb. 18, 2025

(54) TRANSMISSION APPARATUS AND TRANSMISSION SYSTEM

(71) Applicant: Fujitsu Limited, Kawasaki (JP)

(72) Inventors: Xiang Zhang, Yokohama (JP); Atsushi Kodama, Kawasaki (JP); Tatsuya Tsuzuki, Kawasaki (JP); Kyosuke Sone, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 183 days.

(21) Appl. No.: 18/170,799

(22) Filed: Feb. 17, 2023

(65) Prior Publication Data

US 2023/0388040 A1    Nov. 30, 2023

(30) Foreign Application Priority Data

May 31, 2022    (JP) .................................. 2022-088762

(51) Int. Cl.
*H04B 10/00*    (2013.01)
*H04B 10/564*    (2013.01)
*H04J 14/02*    (2006.01)
*H04J 14/00*    (2006.01)

(52) U.S. Cl.
CPC ........ *H04J 14/0221* (2013.01); *H04B 10/564* (2013.01)

(58) Field of Classification Search
CPC .. H04B 10/29; H04B 10/291; H04B 10/2916; H04B 10/293
See application file for complete search history.

(56) References Cited

U.S. PATENT DOCUMENTS

| 2004/0080812 | A1 | 4/2004 | Sugaya et al. | |
| 2021/0111800 | A1* | 4/2021 | Nakata | H04B 10/2916 |
| 2022/0303038 | A1* | 9/2022 | Zhang | H04B 10/2916 |

FOREIGN PATENT DOCUMENTS

| JP | 2004-061647 A | 2/2004 |
| JP | 2007-025510 A | 2/2007 |

* cited by examiner

*Primary Examiner* — Daniel G Dobson
(74) *Attorney, Agent, or Firm* — STAAS & HALSEY LLP

(57) ABSTRACT

A transmission apparatus includes a signal power detector configured to detect signal power of a wavelength-multiplexed optical signal to be transmitted to a transmission line, a variable optical attenuator configured to attenuate the wavelength-multiplexed optical signal, and a processor configured to control an attenuation amount of the variable optical attenuator according to the signal power and whether a Raman amplifier in which pumping light is inputted to the transmission line exists.

14 Claims, 15 Drawing Sheets

| NUMBER OF WAVELENGTHS | SIGNAL POWER (mW) | RAMAN CONFIGURATION | | | |
| --- | --- | --- | --- | --- | --- |
| | | BIDIRECTIONAL | FORWARD ONLY | BACKWARD ONLY | NON-RAMAN |
| | | ATTENUATION AMOUNT (dB) | ATTENUATION AMOUNT (dB) | ATTENUATION AMOUNT (dB) | ATTENUATION AMOUNT (dB) |
| 1 | 0.01 | 2.52 | 2.08 | 0.22 | 0 |
| 16 | 0.16 | 1.99 | 1.76 | 0.20 | 0 |
| 32 | 0.32 | 1.49 | 1.37 | 0.09 | 0 |
| 64 | 0.64 | 0.67 | 0.62 | 0.03 | 0 |
| 96 | 0.96 | 0 | 0 | 0 | 0 |

110a

FIG. 2
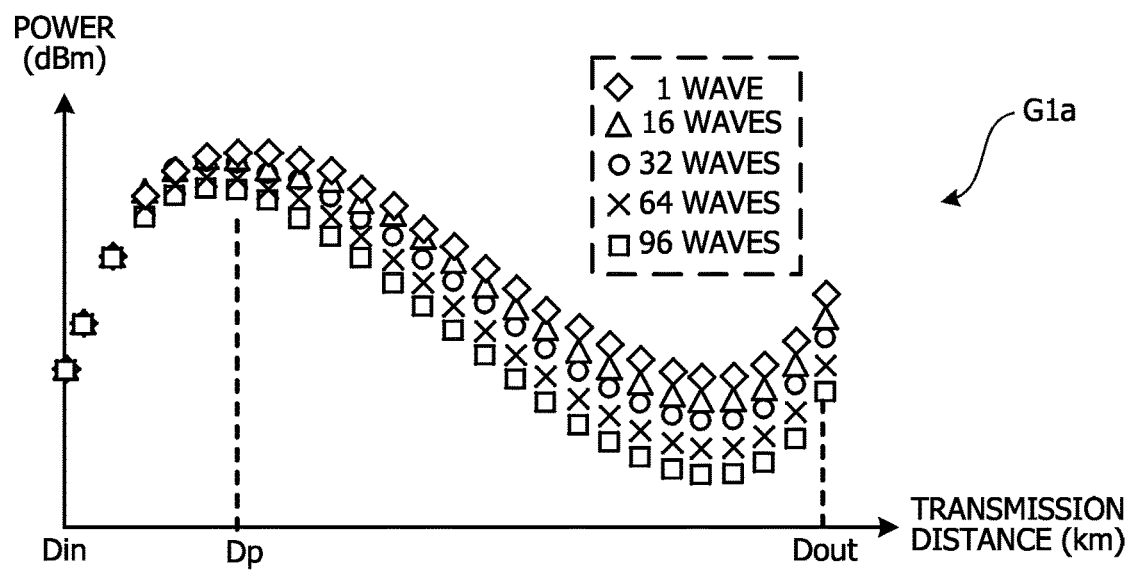
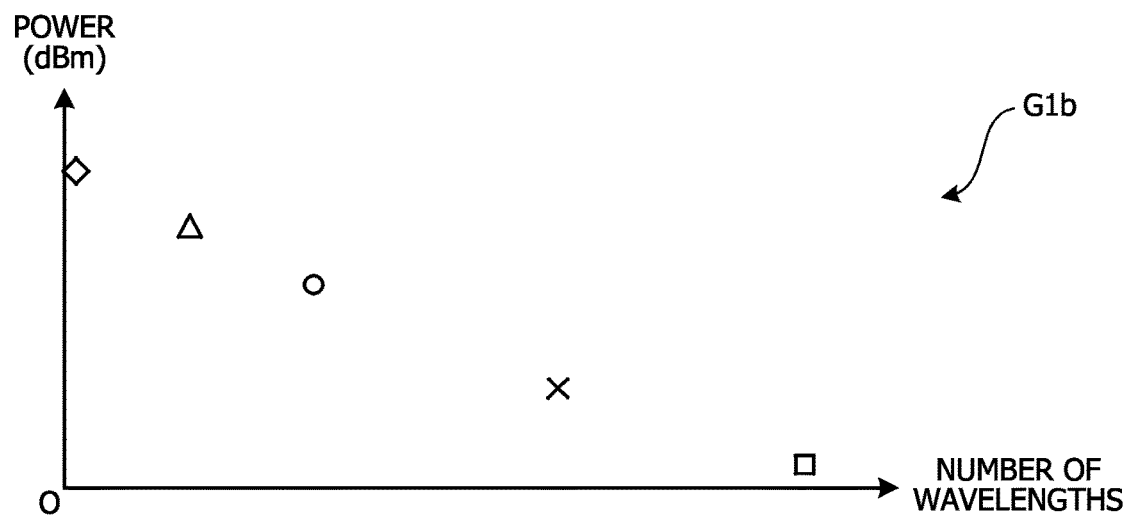
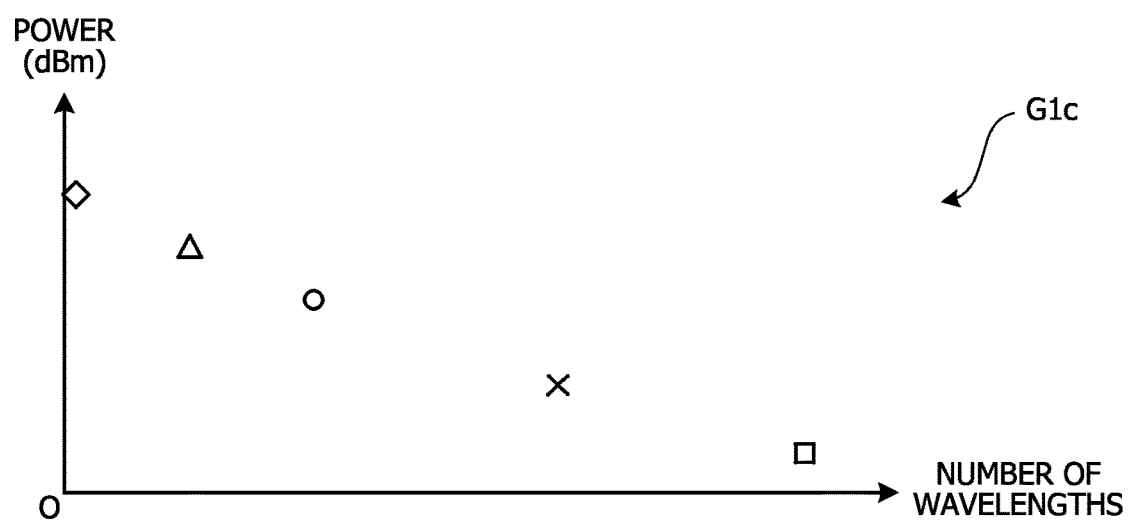

| NUMBER OF WAVELENGTHS | SIGNAL POWER (mW) | RAMAN CONFIGURATION | | | |
|---|---|---|---|---|---|
| | | BIDIRECTIONAL | FORWARD ONLY | BACKWARD ONLY | NON-RAMAN |
| | | ATTENUATION AMOUNT (dB) | ATTENUATION AMOUNT (dB) | ATTENUATION AMOUNT (dB) | ATTENUATION AMOUNT (dB) |
| 1 | 0.01 | 2.52 | 2.08 | 0.22 | 0 |
| 16 | 0.16 | 1.99 | 1.76 | 0.20 | 0 |
| 32 | 0.32 | 1.49 | 1.37 | 0.09 | 0 |
| 64 | 0.64 | 0.67 | 0.62 | 0.03 | 0 |
| 96 | 0.96 | 0 | 0 | 0 | 0 |

TRANSMISSION APPARATUS AND TRANSMISSION SYSTEM

CROSS-REFERENCE TO RELATED APPLICATION

This application is based upon and claims the benefit of priority of the prior Japanese Patent Application No. 2022-88762, filed on May 31, 2022, the entire contents of which are incorporated herein by reference.

FIELD

The embodiments discussed herein are related to a transmission apparatus and a transmission system.

BACKGROUND

A Raman amplifier amplifies, with a low noise factor, an optical signal with a high data rate modulated by a multi-level modulation method such as 8 quadrature amplitude modulation (QAM). For example, Japanese Laid-open Patent Publication No. 2007-025510 describes a point of detecting a reception level of a Raman-amplified optical signal and adjusting a loss amount of a variable attenuator that attenuates the optical signal based on a detection result.

Japanese Laid-open Patent Publication No. 2007-025510 and Japanese Laid-open Patent Publication No. 2004-061647 are disclosed as related art.

SUMMARY

According to an aspect of the embodiments, a transmission apparatus includes a signal power detector configured to detect signal power of a wavelength-multiplexed optical signal to be transmitted to a transmission line, a variable optical attenuator configured to attenuate the wavelength-multiplexed optical signal, and a processor configured to control an attenuation amount of the variable optical attenuator according to the signal power and whether a Raman amplifier in which pumping light is inputted to the transmission line exists.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is graphs illustrating changes in power with respect to transmission distance for each number of wavelengths of a wavelength-multiplexed optical signal;

FIG. 9 is a diagram illustrating a data table of the second embodiment;

DESCRIPTION OF EMBODIMENTS

A gain of Raman amplification depends on the number of wavelengths (number of channels) included in a wavelength-multiplexed optical signal. For this reason, in a wavelength multiplexing optical transmission system, for example, when the number of wavelengths in the wavelength-multiplexed optical signal changes due to add or drop of an optical signal in units of wavelengths, the gain of Raman amplification fluctuates. Therefore, received power of the wavelength-multiplexed optical signal varies according to the number of wavelengths, resulting in a possibility of deterioration in transmission quality.

Meanwhile, the variation in the received power may be reduced by adjusting an attenuation amount of the wavelength-multiplexed optical signal according to a result of monitoring the received power of the wavelength-multiplexed optical signal, as disclosed in Japanese Laid-open Patent Publication No. 2007-025510. However, in a case where the number of wavelengths of the wavelength-multiplexed optical signal fluctuates at high speed due to, for example, frequent optical path switching for a time required to transfer the monitoring result of the received power of the wavelength-multiplexed optical signal to a transmission-side device, it is difficult to adjust the attenuation amount following the high-speed fluctuation of the number of wavelengths.

Furthermore, in the wavelength multiplexing optical transmission system, there are cases where a Raman amplifier is attached to the wavelength multiplexing optical transmission system, and cases where the Raman amplifier is removed from the wavelength multiplexing optical transmission system. For this reason, it is required to adjust the attenuation amount assuming such two cases.

Hereinafter, embodiments of technologies capable to suppress deterioration in the transmission quality regardless of fluctuations in the number of wavelengths of a wavelength-multiplexed optical signal and the presence or absence of a Raman amplifier will be described in detail with reference to the drawings.

[Example of Raman Amplification]

Figure 1:
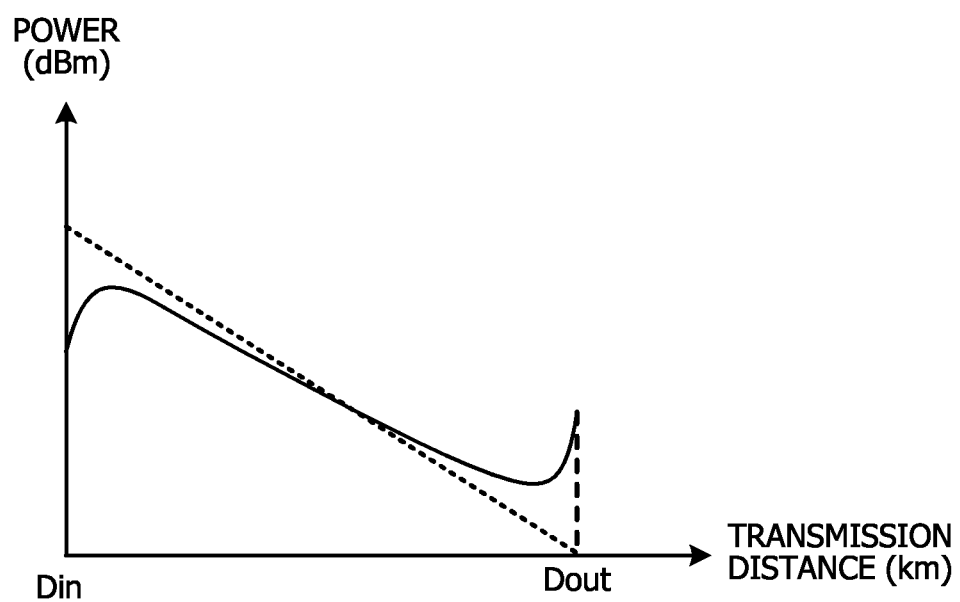
FIG. 1 is a graph illustrating an example of changes in power of optical signals in a transmission line between nodes with respect to transmission distance.

FIG. 1 is a graph illustrating an example of changes in power (dBm) of optical signals in a transmission line between nodes with respect to a transmission distance (km). The solid line indicates a change in power of an optical signal amplified by a bidirectional distributed Raman amplifier and an erbium-doped fiber amplifier (EDFA), and the dotted line indicates a change in power of an optical signal amplified only by the EDFA.

The bidirectional distributed Raman amplifier amplifies the optical signal modulated by a multi-level modulation method such as 8 quadrature amplitude modulation (QAM) or 16QAM with a low noise factor (NF). At an input end Din of the transmission line where an influence of a forward Raman amplifier is significant, the power of the Raman-amplified optical signal is lower than that of a case where the optical signal is amplified only by the EDFA, so deterioration of the optical signal due to a nonlinear optical effect is suppressed.

Furthermore, at an output end Dout of the transmission line where an influence of a rear Raman amplifier is significant, the power of the Raman-amplified optical signal increases more than the case where the optical signal is amplified only by the EDFA, so an optical signal-to-noise ratio (OSNR) is improved. Therefore, the transmission distance of the optical signal may be extended by the bidirectional distributed Raman amplifier.

FIG. 2 is graphs illustrating changes in the power (dBm) with respect to the transmission distance (km) for each number of wavelengths of the wavelength-multiplexed optical signal. Here, examples of the number of wavelengths include 1 wave, 16 waves, 32 waves, 64 waves, and 96 waves. As may be understood by referring to graph G1a, the power at the input end Din of the transmission line is substantially the same regardless of the number of wavelengths, but the closer to the output end Dout of the transmission line, the difference in the power for each number of wavelengths becomes expands. The power for 1 wave is the highest and the power for 96 waves is the lowest.

Graph G1b illustrates a peak value of the power at a peak position Dp in the graph G1a for each number of wavelengths. The smaller the number of wavelengths, the greater the power. For this reason, when the number of wavelengths of the wavelength-multiplexed optical signal decreases, the power increases, so that the deterioration of the wavelength-multiplexed optical signal due to a nonlinear optical effect increases.

Furthermore, graph G1c illustrates the power at the output end Dout of the transmission line in the graph G1a for each number of wavelengths. Here too, the smaller the number of wavelengths at the output end Dout of the transmission line, the larger the power.

Thus, a gain of the Raman amplifier (Raman gain) depends on the number of wavelengths. Therefore, as the wavelength-multiplexed optical signal is transmitted over more spans, the power of the optical signal may not fall within a normal receivable range at a reception node at a final stage due to accumulation of changes in the Raman gain.

First Embodiment

Figure 3:
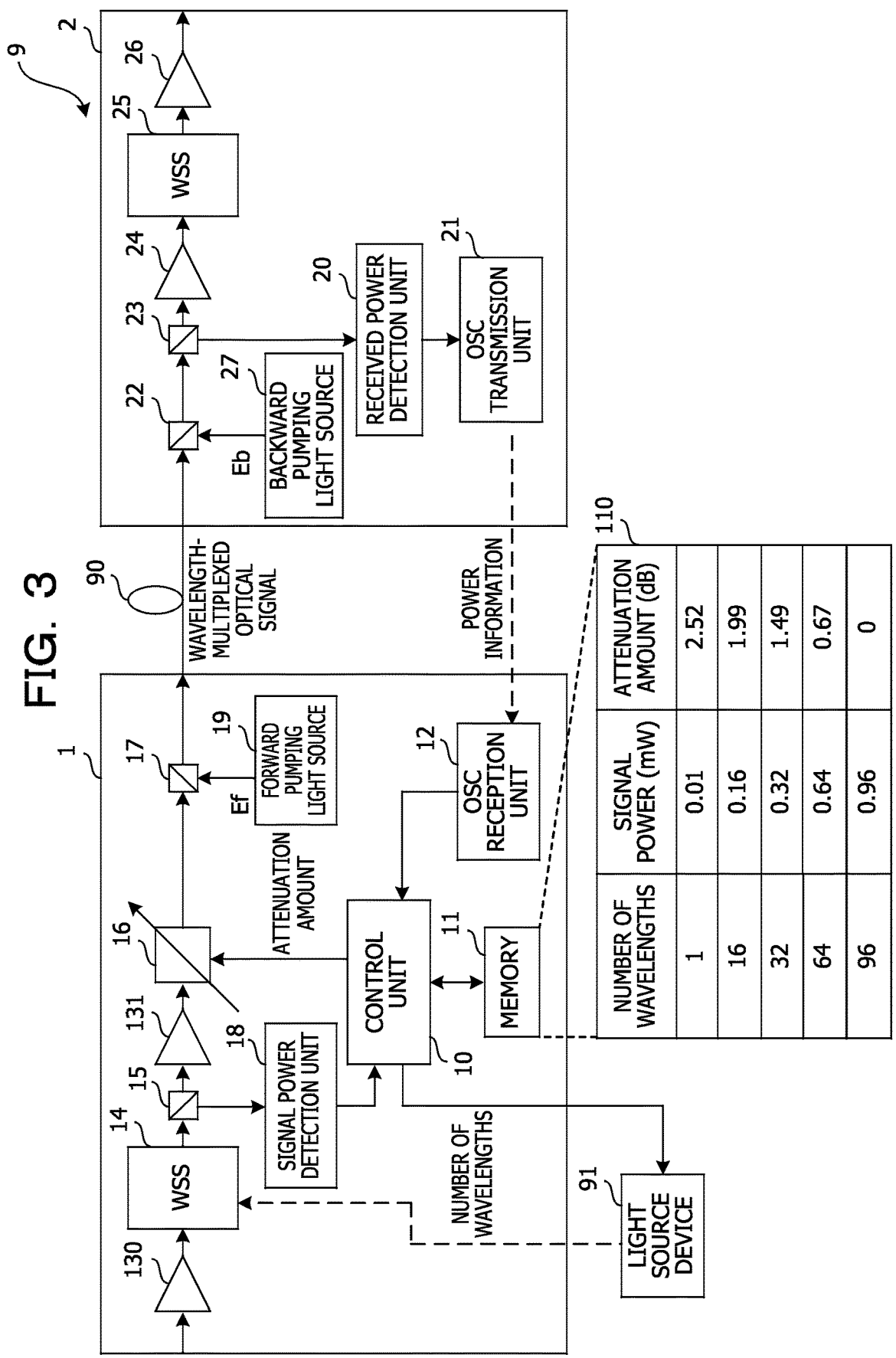
FIG. 3 is a configuration diagram illustrating a transmission system of a first embodiment.

FIG. 3 is a configuration diagram illustrating a transmission system 9 of a first embodiment. The transmission system 9 includes a transmission device 1 that transmits a wavelength-multiplexed optical signal to a transmission line 90, and a reception device 2 that receives the wavelength-multiplexed optical signal from the transmission device 1 via the transmission line 90.

The transmission device 1 and the reception device 2 wavelength-multiplex (add) a new optical signal to the wavelength-multiplexed optical signal, and separate (drop) the optical signal from the wavelength-multiplexed optical signal. The transmission device 1 is an example of a transmission apparatus, and the reception device 2 is an example of a counter device that faces the transmission device 1 via the transmission line 90.

The transmission device 1 includes a control unit 10, a memory 11, an optical supervisory channel (OSC) reception unit 12, a wavelength selective switch (WSS) unit 14, a tap 15, a variable optical attenuator 16, and a wavelength divisional multiplexing (WDM) coupler 17. Furthermore, the transmission device 1 includes a preamplifier 130, a postamplifier 131, a signal power detection unit 18, and a forward pumping light source 19.

The wavelength-multiplexed optical signal is input to the preamplifier 130 from an adjacent node (not illustrated) in a previous stage. The preamplifier 130 is an EDFA, which amplifies the wavelength-multiplexed optical signal and outputs the wavelength-multiplexed optical signal to the WSS unit 14.

The WSS unit 14 includes a wavelength selective switch, an optical coupler, an optical splitter, and the like, and is optically coupled to a plurality of optical transmitter-receivers (transponders) (not illustrated). The WSS unit 14 wavelength-multiplexes (adds) the new optical signal from the optical transmitter-receiver to the wavelength-multiplexed optical signal, and separates (drops) the optical signal from the wavelength-multiplexed optical signal and outputs the optical signal to the optical transmitter-receiver, according to settings from a network monitoring device (not illustrated).

Thus, the number of wavelengths of the wavelength-multiplexed optical signal increases or decreases according to the add or drop by the WSS unit 14. The WSS unit 14 outputs the wavelength-multiplexed optical signal to which the optical signal has been added or dropped to the tap 15.

The tap 15 is, for example, an optical splitter, and splits and outputs the wavelength-multiplexed optical signal to the postamplifier 131 and the signal power detection unit 18. The signal power detection unit 18 includes a photodiode and the like, for example, and detects power (hereinafter referred to as signal power) of the wavelength-multiplexed optical signal to be output to the transmission line 90 and outputs a detected value to the control unit 10. The postamplifier 131 is an EDFA, which amplifies the wavelength-multiplexed optical signal and outputs the wavelength-multiplexed optical signal to the variable optical attenuator 16.

The variable optical attenuator 16 attenuates the wavelength-multiplexed optical signal by an attenuation amount set by the control unit 10. Thereby, the control unit 10 adjusts the power of the wavelength-multiplexed optical signal to an appropriate value so that transmission quality of the transmission system 9 satisfies requirements. The wavelength-multiplexed optical signal is input from the variable optical attenuator 16 to the WDM coupler 17.

The WDM coupler 17 is optically coupled to the forward pumping light source 19. The forward pumping light source 19 is a laser diode and outputs forward pumping light Ef to the WDM coupler 17. The wavelength-multiplexed optical signal is multiplexed with the forward pumping light Ef in the WDM coupler 17 and transmitted to the transmission line 90. Since the forward pumping light Ef is output from the forward pumping light source 19 to the transmission line 90 of the wavelength-multiplexed optical signal in this manner, the wavelength-multiplexed optical signal is Raman-amplified.

The wavelength-multiplexed optical signal is input to the reception device 2 from the transmission line 90.

The reception device 2 includes a received power detection unit 20, an OSC transmission unit 21, a WDM coupler 22, a tap 23, a preamplifier 24, a WSS unit 25, a postamplifier 26, and a backward pumping light source 27. The WDM coupler 22 is optically coupled to the backward pumping light source 27.

The backward pumping light source 27 is a laser diode and outputs backward pumping light Eb to the transmission line 90 via the WDM coupler 22. The backward pumping light Eb flows through the transmission line 90 in an opposite direction to the wavelength-multiplexed optical signal. Thereby, the wavelength-multiplexed optical signal is Raman-amplified.

The forward pumping light source 19 and the backward pumping light source 27 are bidirectional distributed Raman amplifiers. However, the transmission system 9 may have only one of the forward pumping light source 19 and the backward pumping light source 27, and even in this case Raman amplification of the wavelength-multiplexed optical signals is possible. Note that the forward pumping light source 19 and the backward pumping light source 27 are examples of Raman amplifiers, and the forward pumping light and the backward pumping light are examples of pumping light. Both the forward pumping light source 19 and the backward pumping light source 27 may be attached and detached by plugging.

The wavelength-multiplexed optical signal is input from the WDM coupler 22 to the tap 23. The tap 23 is, for example, an optical splitter, which splits and outputs the wavelength-multiplexed optical signal to the preamplifier 24 and the received power detection unit 20. The received power detection unit 20 includes a photodiode and the like, for example, and detects the power (hereinafter referred to as received power) of the wavelength-multiplexed optical signal received by the reception device 2 and outputs the received power to the OSC transmission unit 21. The preamplifier 24 is an EDFA, which amplifies and outputs the wavelength-multiplexed optical signal to the WSS unit 25.

The WSS unit 25 includes a wavelength selective switch, an optical coupler, an optical splitter, and the like, and is optically coupled to a plurality of optical transmitter-receivers (transponders) (not illustrated). The WSS unit 25 wavelength-multiplexes the new optical signal from the optical transmitter-receiver to the wavelength-multiplexed optical signal, and separates the optical signal from the wavelength-multiplexed optical signal and outputs the optical signal to the optical transmitter-receiver, according to settings from a network monitoring device (not illustrated), similarly to the WSS unit 14 of the transmission device 1. The WSS unit 25 outputs the wavelength-multiplexed optical signal to which the optical signal has been added or dropped to the postamplifier 26. The postamplifier 26 is an EDFA, which amplifies the wavelength-multiplexed optical signal and outputs the wavelength-multiplexed optical signal to other devices.

The OSC transmission unit 21 communicates with the OSC reception unit 12 of the transmission device 1 via an OSC communication line. The OSC transmission unit 21 includes a logic circuit, a laser diode, and the like, and transmits power information indicating the received power of the wavelength-multiplexed optical signal to the OSC reception unit 12, for example, at activation of the transmission system 9, that is, before the start of operation. Note that the reception device 2 may communicate with the transmission device 1 via, for example, the network monitoring device instead of the OSC.

The OSC reception unit 12 includes a logic circuit, a photodiode, and the like, and receives the power information from the OSC transmission unit 21 via the OSC. The OSC reception unit 12 outputs the power information to the control unit 10. Thereby, the control unit 10 acquires the received power of the wavelength-multiplexed optical signal from the reception device 2. Note that the OSC transmission unit 21 is an example of a notification unit that notifies the control unit 10 of the received power.

The control unit 10 is, for example, a central processing unit (CPU) circuit, and executes a series of processing according to a program. Note that the control unit 10 is not limited to the CPU circuit and may be, for example, a circuit including hardware such as a field programmable gate array (FPGA) or an application specified integrated circuit (ASIC).

The control unit 10 generates a data table 110 to be stored in the memory 11 before the start of operation of the transmission system 9. Correlation among the number of wavelengths of the wavelength-multiplexed optical signal and the signal power in a case where the received power of the wavelength-multiplexed optical signal is a target value, and the attenuation amount of the variable optical attenuator 16 is registered in the data table 110. Here, the number of wavelengths of the wavelength-multiplexed optical signal is registered in advance from a network management device or the like prior to the signal power and the attenuation amount. Note that the data table 110 is an example of correlation data, and the memory 11 is an example of a storage unit that stores the data table 110.

Before the start of operation of the transmission system 9, the control unit 10 performs light emission control of the light source device 91 optically coupled to the transmission device 1, and measures the signal power and the attenuation amount for each number of wavelengths in the data table 110. The light source device 91 includes a light source for light of a plurality of wavelengths, an optical coupler, and the like, and generates the wavelength-multiplexed optical signal obtained by wavelength-multiplexing light for the number of wavelengths set by the control unit 10. The wavelength-multiplexed optical signal is input from the light source device 91 to the WSS unit 14 and output to the tap 15.

For this reason, the control unit 10 measures the signal power and the attenuation amount of the wavelength-multiplexed optical signal from the light source device 91 even when the wavelength-multiplexed optical signal as a main signal is not input to the WSS unit 14 from the adjacent node (not illustrated) at the previous stage, before the start of operation of the transmission system 9. Note that the light source device 91 may be mounted inside the transmission device 1.

Prior to measuring the signal power and the attenuation amount, the control unit 10 determines the target value of the received power of the wavelength-multiplexed optical signal. As an example, the control unit 10 sets the received power of when the number of wavelengths included in the wavelength-multiplexed optical signal is maximum as the target value. At this time, the control unit 10 sets the maximum number of wavelengths in the light source device 91 and sets the attenuation amount of the variable optical attenuator 16 to zero. After setting the number of wavelengths and the attenuation amount, the control unit 10 acquires the received power detected by the received power detection unit 20 from the power information and sets the received power as the target value.

Thereafter, the control unit 10 adjusts the attenuation amount according to a change in the signal power according to the number of wavelengths included in the wavelength-multiplexed optical signal so that the received power reaches the target value. In adjusting the attenuation amount, every time setting the number of wavelengths registered in the data table 110 to the light source device 91, the control unit 10 acquires the signal power from the signal power detection unit 18, and obtains the received power from the received power detection unit 20. The control unit 10 adjusts the attenuation amount so that the received power reaches the target value, and registers the signal power and the attenuation amount of when the adjustment is completed to the data table 110.

Furthermore, during the operation of the transmission system 9, the control unit 10 stops the light emission of the light source device 91 and determines the attenuation amount based on the data table 110 from the signal power of the wavelength-multiplexed optical signal from the adjacent node. For example, the control unit 10 searches for the attenuation amount corresponding to the signal power closest to the signal power detected by the signal power detection unit 18 among the signal power registered in the data table 110, and sets the signal power to the variable optical attenuator 16.

In the data table 110, the larger the number of wavelengths, the greater the signal power, and the greater the signal power, the smaller the attenuation amount. For example, in the case where the number of wavelengths is 1, the signal power is 0.01 (mW) and the attenuation amount is 2.52 (dB). Furthermore, in the case where the number of wavelengths is 96, the signal power is 0.96 (mW) and the attenuation amount is 0 (dB).

As described with reference to FIG. 2, the Raman gain decreases and the received power decreases as the number of wavelengths increases. Therefore, the control unit 10 reduces the attenuation amount as the signal power increases according to the number of wavelengths, according to the data table 110, thereby averaging the received power that changes according to the number of wavelengths. Thereby, the control unit 10 sets the received power to a fixed target value regardless of the number of wavelengths of the wavelength-multiplexed optical signal.

Thus, the control unit 10 reduces the attenuation amount of the variable optical attenuator 16 according to the increase in the signal power. Here, the data table 110 is not necessarily required, and the control unit 10 calculates the attenuation amount for setting the received power to the target value from the signal power according to, for example, a preset arithmetic expression. Therefore, the control unit 10 appropriately controls the attenuation amount without obtaining the received power from the reception device 2 during transmission of the wavelength-multiplexed signal light.

Therefore, the transmission device 1 suppresses deterioration in the transmission quality even if the number of wavelengths of the wavelength-multiplexed optical signal fluctuates at high speed.

In the present example, since the control unit 10 determines the attenuation amount during the operation of the transmission system 9 based on the data table 110 generated before the start of operation, the control unit 10 does not need to acquire the received power from the reception device 2, and also easily determines the appropriate attenuation amount.

Figure 4:
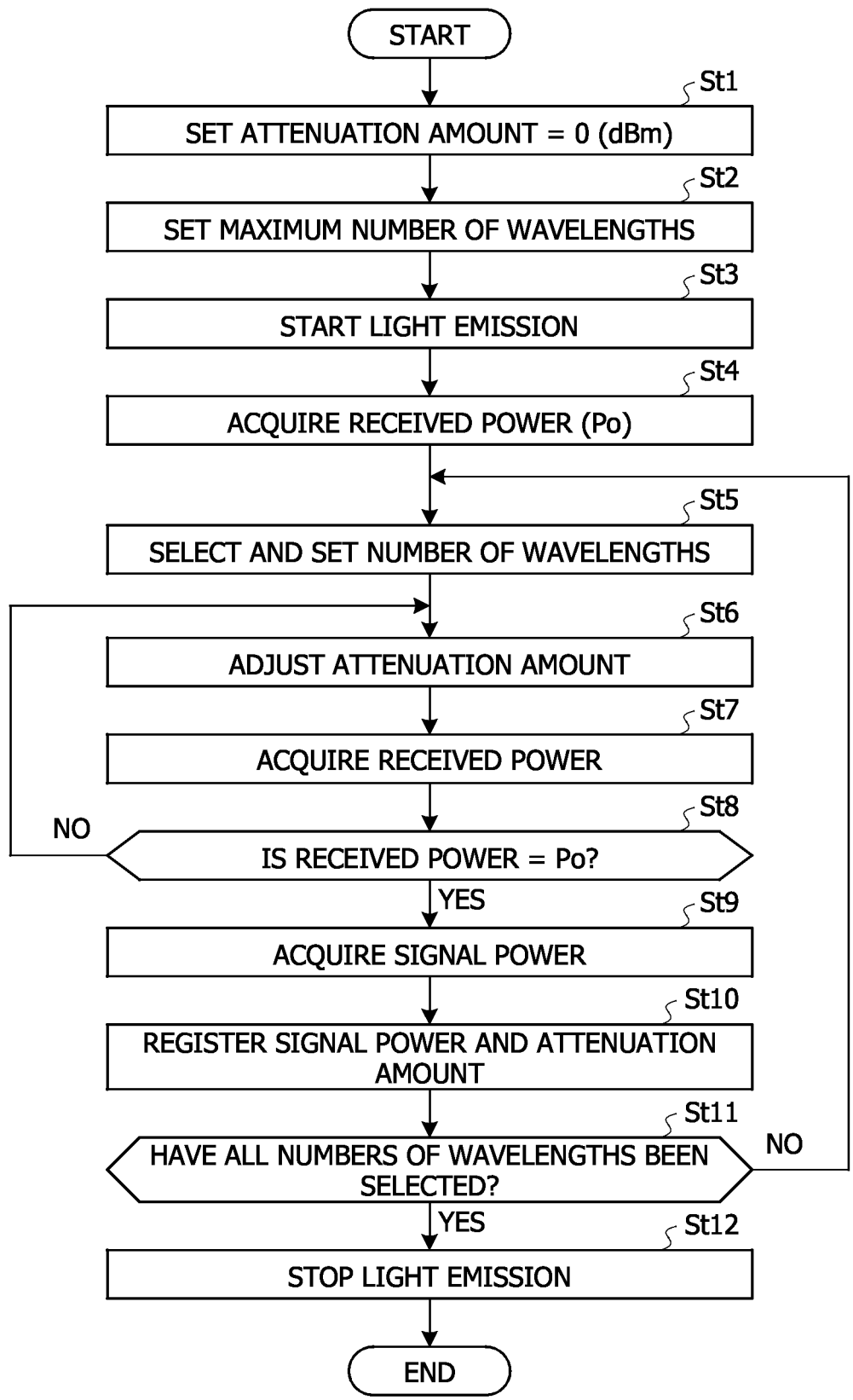
FIG. 4 is a flowchart illustrating an example of an operation of a control unit before start of operation of the transmission system of the first embodiment.

FIG. 4 is a flowchart illustrating an example of an operation of the control unit 10 before the start of operation of the transmission system 9 of the first embodiment. To determine the target value of the received power, the control unit 10 sets the attenuation amount of the variable optical attenuator 16 to 0 (dBm) (operation St1) and the maximum number of wavelengths to the light source device 91 among the numbers of wavelengths in the data table 110 (operation St2).

Next, the control unit 10 causes the light source device 91 to start light emission (operation St3). Thereby, the wavelength-multiplexed optical signal with the maximum number of wavelengths is output from the light source device 91 to the WSS unit 14.

Next, the control unit 10 acquires the received power from the power information received via the OSC (operation St4). At this time, the control unit 10 sets the acquired received power as a target value Po. In this way, the control unit 10 sets the received power of when the number of wavelengths included in the wavelength-multiplexed optical signal is the maximum as the target value, and thus controls the received power based on the lowest Raman gain during the operation of the transmission system 9. Note that the control unit 10 is not limited to this example, and may set the received power corresponding to another number of wavelengths as the target value.

Next, the control unit 10 selects the number of wavelengths from the data table 110 and sets the number of wavelengths in the light source device 91 (operation St5). Thereby, the wavelength-multiplexed optical signal with the set number of wavelengths is output from the light source device 91 to the WSS unit 14. Note that the order of selecting the number of wavelengths in the data table 110 is not limited.

Next, the control unit 10 adjusts the attenuation amount (operation St6) and acquires the received power from the power information received via the OSC (operation St7). At this time, the control unit 10 increases or decreases the attenuation amount, for example, for each predetermined step size.

Next, the control unit 10 compares the received power with the target value Po (operation St8). At this time, the control unit 10 determines whether the received power is substantially the same as the target value Po. For example, the control unit 10 determines that the received power is substantially the same as the target value Po in a case where the received power falls within a predetermined range including the target value Po, or determines that the received power is different from the target value Po in a case where the received power falls outside the predetermined range.

In the case where the received power is different from the target value Po (No in operation St8), the processing of operation St6 and subsequent operations is executed again. Furthermore, in the case where the received power is substantially the same as the target value Po (Yes in operation St8), the control unit 10 acquires the signal power from the signal power detection unit 18 (operation St9).

Next, the control unit 10 registers the signal power and the attenuation amount to the data table 110 (operation St10). Thereby, the correlation between the signal power of when the received power reaches the target value and the attenuation amount is registered in the data table 110.

Next, the control unit 10 determines whether all the numbers of wavelengths registered in the data table 110 have been selected (operation St11). In a case where there is an unselected number of wavelengths (No in operation St11), the unselected number of wavelengths is selected (operation St5), and each processing of operation St6 and subsequent operations is executed again.

Furthermore, in a case where all the numbers of wavelengths have been selected (Yes in operation St11), the control unit 10 stops the light emission of the light source device 91 (operation St12). In this manner, the operation of the control unit 10 before the start of operation of the transmission system 9 is performed.

Figure 5:
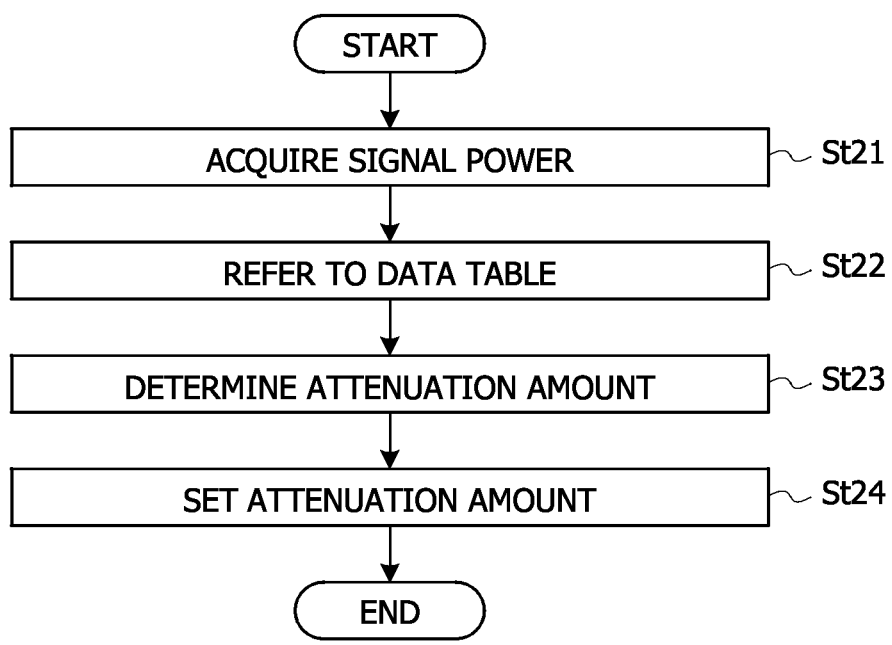
FIG. 5 is a flowchart illustrating an example of the operation of the control unit during the operation of the transmission system of the first embodiment.

FIG. 5 is a flowchart illustrating an example of the operation of the control unit 10 during the operation of the transmission system 9 of the first embodiment. This operation is repeatedly executed while the transmission system 9 is in operation. The control unit 10 acquires the signal power from the signal power detection unit 18 (operation St21).

Next, the control unit 10 refers to the data table 110 based on the signal power (operation St22). At this time, the control unit 10 searches for the value closest to the signal power acquired from the signal power detection unit 18 among the signal power in the data table 110, for example.

Next, the control unit 10 determines the attenuation amount from the signal power based on the data table 110 (operation St23). At this time, the control unit 10 determines the attenuation amount corresponding to the signal power retrieved from the data table 110 as the attenuation amount (control value) of the variable optical attenuator 16.

Next, the control unit 10 sets the determined attenuation amount in the variable optical attenuator 16 (operation St24). As a result, the received power is controlled to the target value Po. In this manner, the operation of the control unit 10 during operation of the transmission system 9 is performed.

Figure 6:
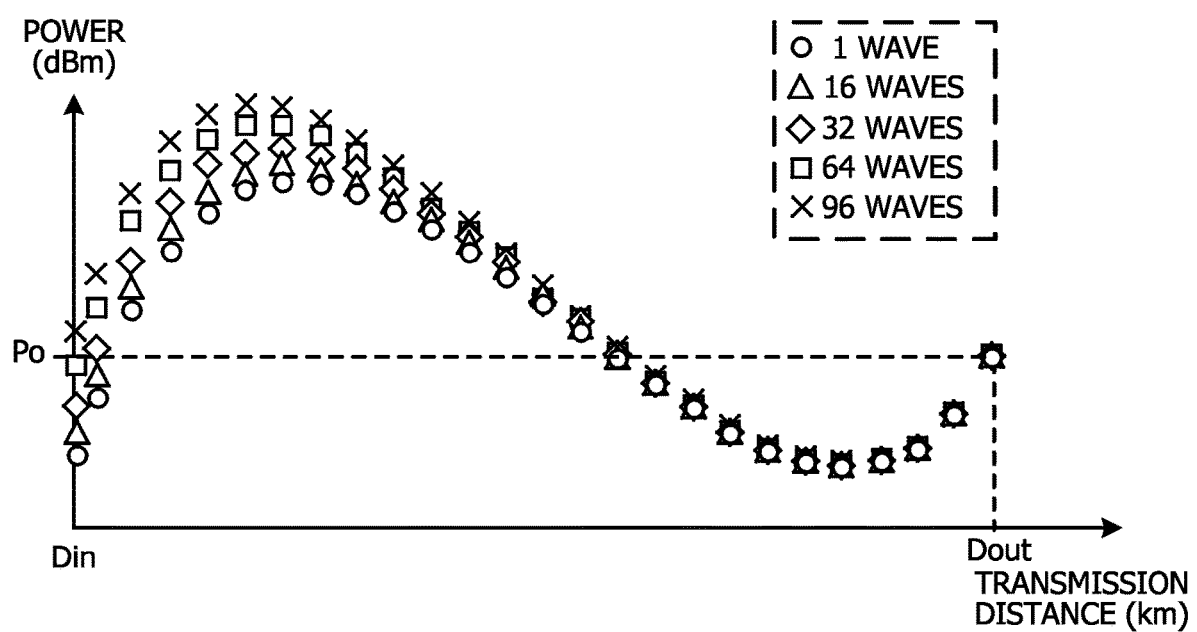
FIG. 6 is a graph illustrating a change in power with respect to transmission distance for each number of wavelengths of a wavelength-multiplexed optical signal in a case where the control unit controls an attenuation amount.

FIG. 6 is a graph illustrating a change in power (dBm) with respect to transmission distance (km) for each number of wavelengths of the wavelength-multiplexed optical signal in a case where the control unit 10 controls the attenuation amount. Although the power at the input end Din of the transmission line 90 varies for each number of wavelengths, the power at the output end Dout of the transmission line 90, for example, the received power, is controlled to the target value Po regardless of the number of wavelengths. Therefore, the transmission quality of the wavelength-multiplexed optical signal is improved.

In the present example, the data table 110 contains a combination of the signal power and the attenuation amount, so it may be easily generated from a measurement result of the signal power and the attenuation amount. However, the embodiment is not limited to this, and the control unit 10 may calculate coefficients of a formula representing the correlation between the signal power and the attenuation amount and store the coefficients in the memory 11, and calculate the attenuation amount according to the formula.

Figure 7:
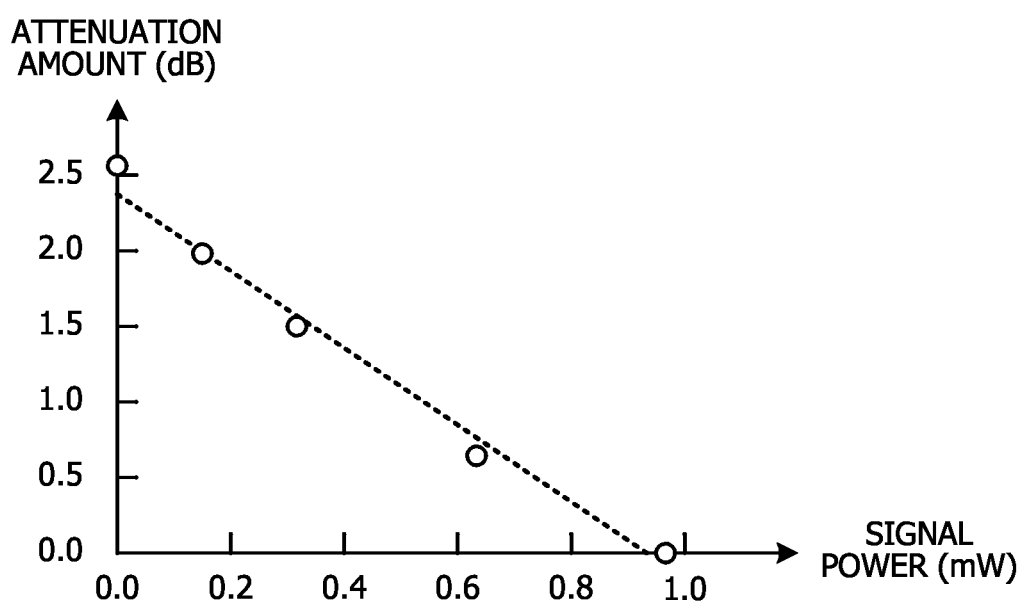
FIG. 7 is a graph illustrating an example of a relationship between signal power and attenuation amount.

FIG. 7 is a graph illustrating an example of the relationship between the signal power (mW) and the attenuation amount (dB). In the graph, the signal power and the attenuation amount registered in the data table 110 of the above-described example are plotted (see the circles). The control unit 10 approximates the signal power and the attenuation amount of the above-described measurement result to a straight line of a linear function indicated by the dotted line.

$$\text{The attenuation amount} = A \times \text{the signal power} + B \tag{1}$$

For example, the control unit 10 fits the relationship between the signal power and the attenuation amount of the measurement result to the above-described equation (1) before the start of operation of the transmission system 9. In the example of FIG. 7, the control unit 10 calculates a coefficient A=−2.63 and a coefficient B=2.43 by fitting the linear function indicated by the dotted line to the equation (1).

The control unit 10 stores the coefficient A=−2.63 and the coefficient B=2.43 in the memory 11. Here, the coefficients A and B are examples of correlation data regarding the correlation between the signal power and the attenuation amount.

$$\text{The attenuation amount} = -2.63 \times \text{the signal power} + 2.43 \tag{2}$$

After the start of operation of the transmission system 9, the control unit 10 reads out the coefficients A and B from the memory 11 and substitutes the coefficients A and B into the equation (1) to generate the above-described equation (2). During the operation of the transmission system 9, the control unit 10 calculates the attenuation amount from the signal power using the equation (2).

Thus, the control unit 10 determines the attenuation amount based on the coefficients A and B from the signal power. Therefore, the control unit 10 calculates the attenuation amount with higher accuracy than the case of using the data table 110. Note that the formulas used by the control unit 10 are not limited to linear functions, and may be other formulas such as quadratic functions.

As described above, the control unit 10 controls the attenuation amount of the variable optical attenuator 16 according to the change in the signal power according to the number of wavelengths such that the received power of the wavelength-multiplexed optical signal reaches the target value, and generates the data table 110 or the coefficients A and B of the equation (1) based on the signal power and the attenuation amount of when the received power reaches the target value by controlling the attenuation amount, before the start of operation of the transmission system 9. Furthermore, after generating the data table 110 or the coefficients A and B, the control unit 10 determines the attenuation amount based on the data table 110 or the coefficients A and B from the signal power during the operation of the transmission system 9.

Therefore, during the operation of the transmission system 9, the control unit 10 does not need to acquire the received power from the reception device 2 in order to determine the attenuation amount. Therefore, the transmission device 1 controls the received power to the target value so as to follow the high-speed fluctuation of the number of wavelengths of the wavelength-multiplexed optical signal, and suppresses the deterioration in the transmission quality.

Note that, in the present example, the control unit 10 uses the transmission system 9 to generate the data table 110 or the coefficients A and B and store them in the memory 11, but the present embodiment is not limited to this. The data table 110 or the coefficients A and B may be stored in the memory 11 in advance from experimental results and simulation results based on design values of the transmission system 9. Even in this case, since the control unit 10 uses the data table 110 or the coefficients A and B stored in the memory 11, similar effects to those described above may be obtained.

Furthermore, the signal power detection unit 18 of the present example detects the power of the wavelength-multiplexed optical signal between the WSS unit 14 and the postamplifier 131 as the signal power, but it is not limited to this. For example, the signal power detection unit 18 may detect the signal power between the postamplifier 131 and the variable optical attenuator 16. Even in this case, since the signal power changes according to the number of wavelengths of the wavelength-multiplexed optical signal, similar effects to those described above may be obtained.

Second Embodiment

In the first embodiment, the memory 11 stores the data table 110 regarding the correlation between the signal power and the attenuation amount, but an embodiment is not limited to this. As in the following example, a data table regarding correlation among signal power of when received power reaches a target value, an attenuation amount, and a Raman configuration to be described below may be stored in a memory 11.

Figure 8:
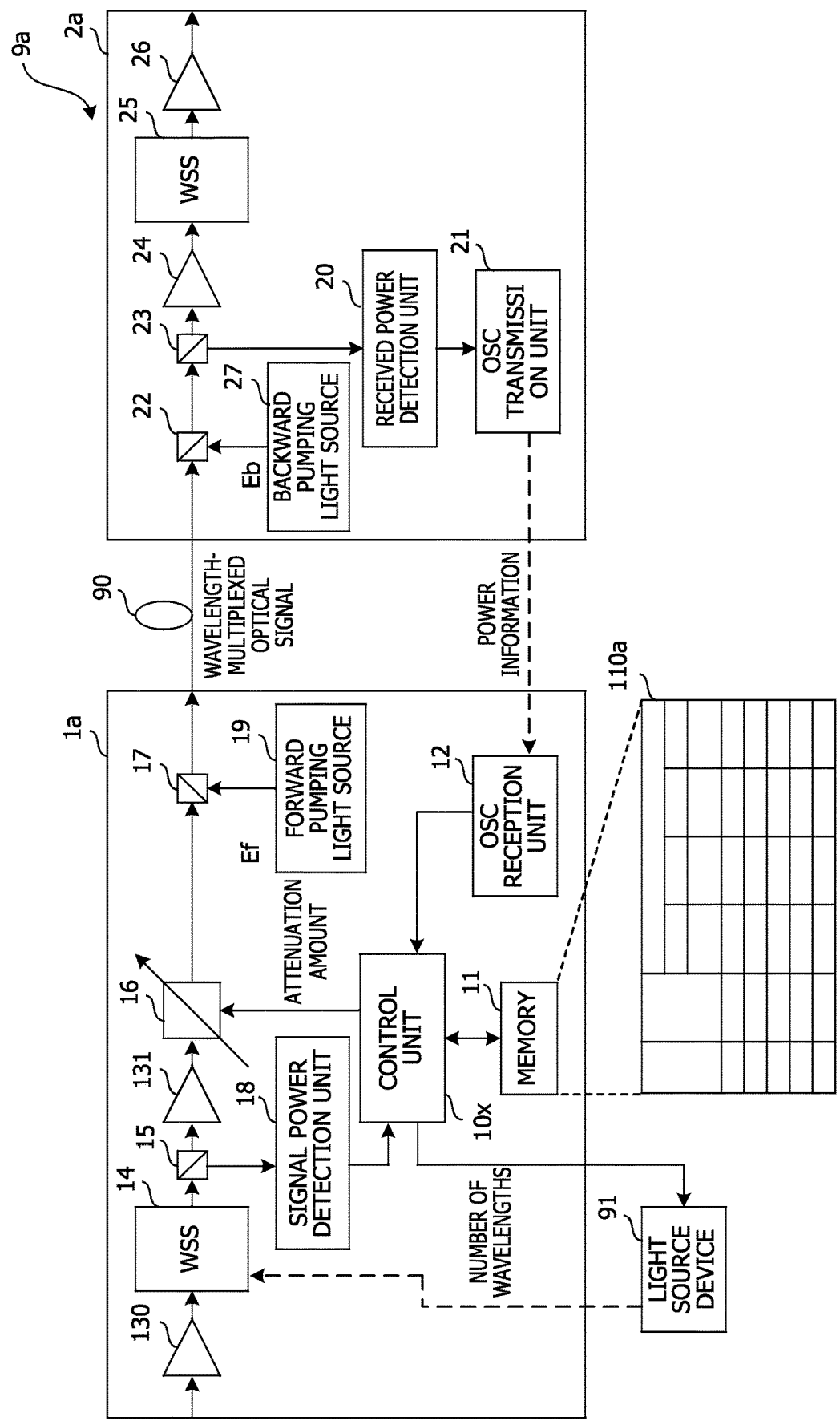
FIG. 8 is a configuration diagram illustrating a transmission system of a second embodiment (part 1)

FIG. 8 is a configuration diagram illustrating a transmission system 9a of a second embodiment. In FIG. 8, the same components as those in FIG. 3 are denoted by the same reference numerals, and description thereof will be omitted.

The transmission system 9a includes a transmission device 1a that transmits a wavelength-multiplexed optical signal to a transmission line 90, and a reception device 2a that receives the wavelength-multiplexed optical signal from the transmission device 1a via the transmission line 90.

The transmission device 1a includes a control unit 10x, the memory 11, an OSC reception unit 12, a WSS unit 14, a tap 15, a variable optical attenuator 16, and a WDM coupler 17. Furthermore, the transmission device 1a includes a preamplifier 130, a postamplifier 131, a signal power detection unit 18, and a forward pumping light source 19. The reception device 2a includes a received power detection unit 20, an OSC transmission unit 21, a WDM coupler 22, a tap 23, a preamplifier 24, a WSS unit 25, a postamplifier 26, and a backward pumping light source 27. The WDM coupler 22 is optically coupled to the backward pumping light source 27.

As in the first embodiment, the control unit 10x acquires signal power from the signal power detection unit 18 and acquires received power from the reception device 2a via the OSC. The control unit 10x is, for example, a CPU circuit, and executes a series of processing according to a program. Note that the control unit 10x is not limited to a CPU circuit, and may be a circuit including hardware such as an FPGA or an ASIC, for example.

Before start of operation of the transmission system 9a, the control unit 10x generates a data table 110a from measurement results of the signal power and the attenuation amount for each Raman configuration by a similar method to the first embodiment.

FIG. 9 is a diagram illustrating the data table 110a of the second embodiment. In the data table 110a, a combination of the signal power and the attenuation amount corresponding to the number of wavelengths is registered for each Raman configuration. An example of the Raman configuration includes a bidirectional distributed Raman configuration in which the transmission device 1a has the forward pumping light source 19 and the reception device 2a has the backward pumping light source 27. However, the embodiment is not limited to this, and various Raman configurations to be described below may be adopted. Note that the data table 110a is an example of correlation data.

The control unit 10x determines the attenuation amount of the variable optical attenuator 16 based on the data table 110a from the signal power and the Raman configuration during the operation of the transmission system 9a. For example, the control unit 10x determines the attenuation amount from the correlation between the signal power and the attenuation amount according to the Raman configuration.

Furthermore, the control unit 10x may generate the coefficients A and B of the above-described equation (1) for each Raman configuration, instead of the data table 110a.

Figure 10:
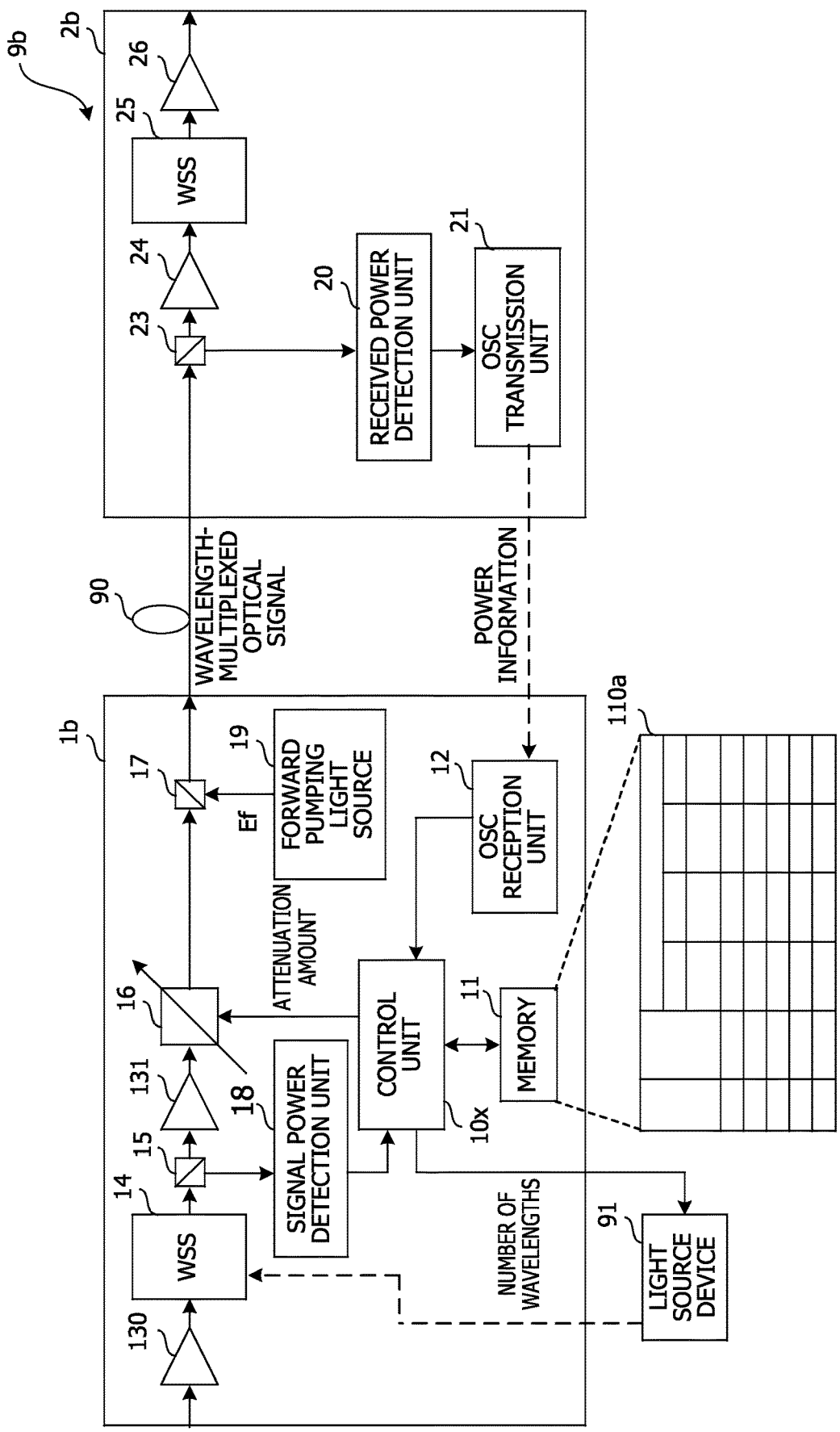
FIG. 10 is a configuration diagram illustrating a transmission system of the second embodiment (part 2)

FIG. 10 is a configuration diagram illustrating a transmission system 9b of the second embodiment. The transmission system 9b includes a transmission device 1b that transmits the wavelength-multiplexed optical signal to the transmission line 90, and a reception device 2b that receives the wavelength-multiplexed optical signal from the transmission device 1b via the transmission line 90. In FIG. 10, the same components as those in FIG. 9 are denoted by the same reference numerals, and description thereof will be omitted.

The transmission device 1b includes the control unit 10x, the memory 11, the OSC reception unit 12, the WSS unit 14, the tap 15, the variable optical attenuator 16, and the WDM coupler 17. Furthermore, the transmission device 1b includes the preamplifier 130, the postamplifier 131, the signal power detection unit 18, and the forward pumping light source 19. The WDM coupler 17 is optically coupled to the forward pumping light source 19. The reception device 2b includes the received power detection unit 20, the OSC transmission unit 21, the tap 23, the preamplifier 24, the WSS unit 25, and the postamplifier 26.

Thus, the reception device 2b does not include the WDM coupler 22 and the backward pumping light source 27, and is different from the above-described reception device 2a. For example, in the transmission system 9b, the forward pumping light source 19 is attached to the transmission device 1b, and the backward pumping light source 27 is removed from the reception device 2b. Such a forward pumping Raman configuration in which the transmission device 1b has the forward pumping light source 19 and the reception device 2b does not have the backward pumping light source 27 may be adopted as the Raman configuration. Note that, in FIG. 9, such a forward pumping Raman configuration is described as forward only.

Figure 11:
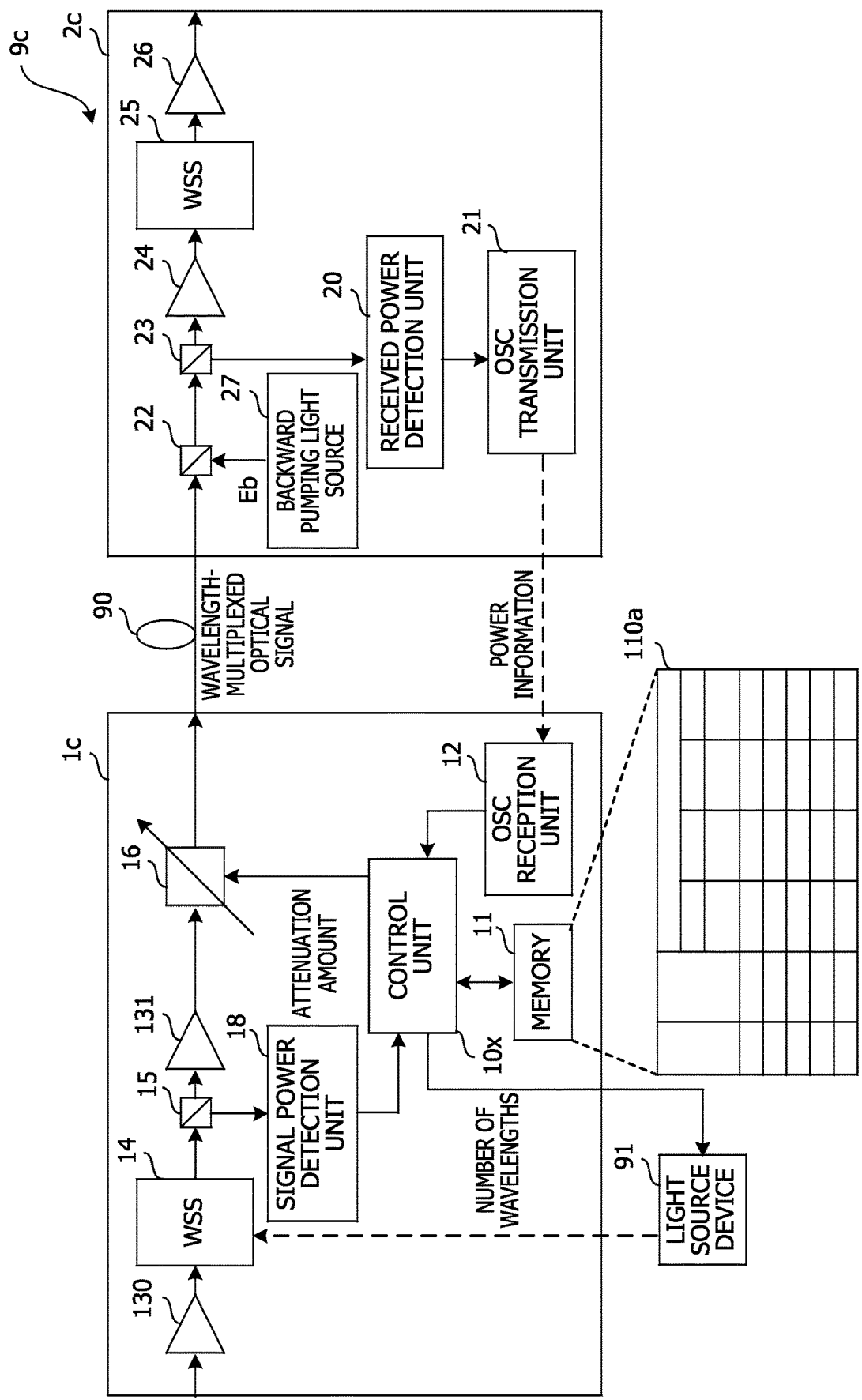
FIG. 11 is a configuration diagram illustrating a transmission system of the second embodiment (part 3)

FIG. 11 is a configuration diagram illustrating a transmission system 9c of the second embodiment. The transmission system 9c includes a transmission device 1c that transmits the wavelength-multiplexed optical signal to the transmission line 90, and a reception device 2c that receives the wavelength-multiplexed optical signal from the transmission device 1c via the transmission line 90. In FIG. 11, components common to those in FIG. 9 are denoted by the same reference signs, and descriptions thereof will be omitted.

The transmission device 1c includes the control unit 10x, the memory 11, the OSC reception unit 12, the WSS unit 14, the tap 15, and the variable optical attenuator 16. Furthermore, the transmission device 1c includes the preamplifier 130, the postamplifier 131, and the signal power detection unit 18. The reception device 2c includes the received power detection unit 20, the OSC transmission unit 21, the WDM coupler 22, the tap 23, the preamplifier 24, the WSS unit 25, the postamplifier 26, and the backward pumping light source 27. The WDM coupler 22 is optically coupled to the backward pumping light source 27.

Thus, the transmission device 1c does not include the WDM coupler 17 and the forward pumping light source 19, and is different from the above-described transmission device 1a. For example, in the transmission system 9c, the forward pumping light source 19 is removed from the transmission device 1c, and the backward pumping light source 27 is attached to the reception device 2c. Such a backward pumping Raman configuration in which the transmission device 1c does not have the forward pumping light source 19 and the reception device 2c has the backward pumping light source 27 may be adopted as the Raman configuration. Note that, in FIG. 9, the backward pumping Raman configuration is described as backward only.

Figure 12:
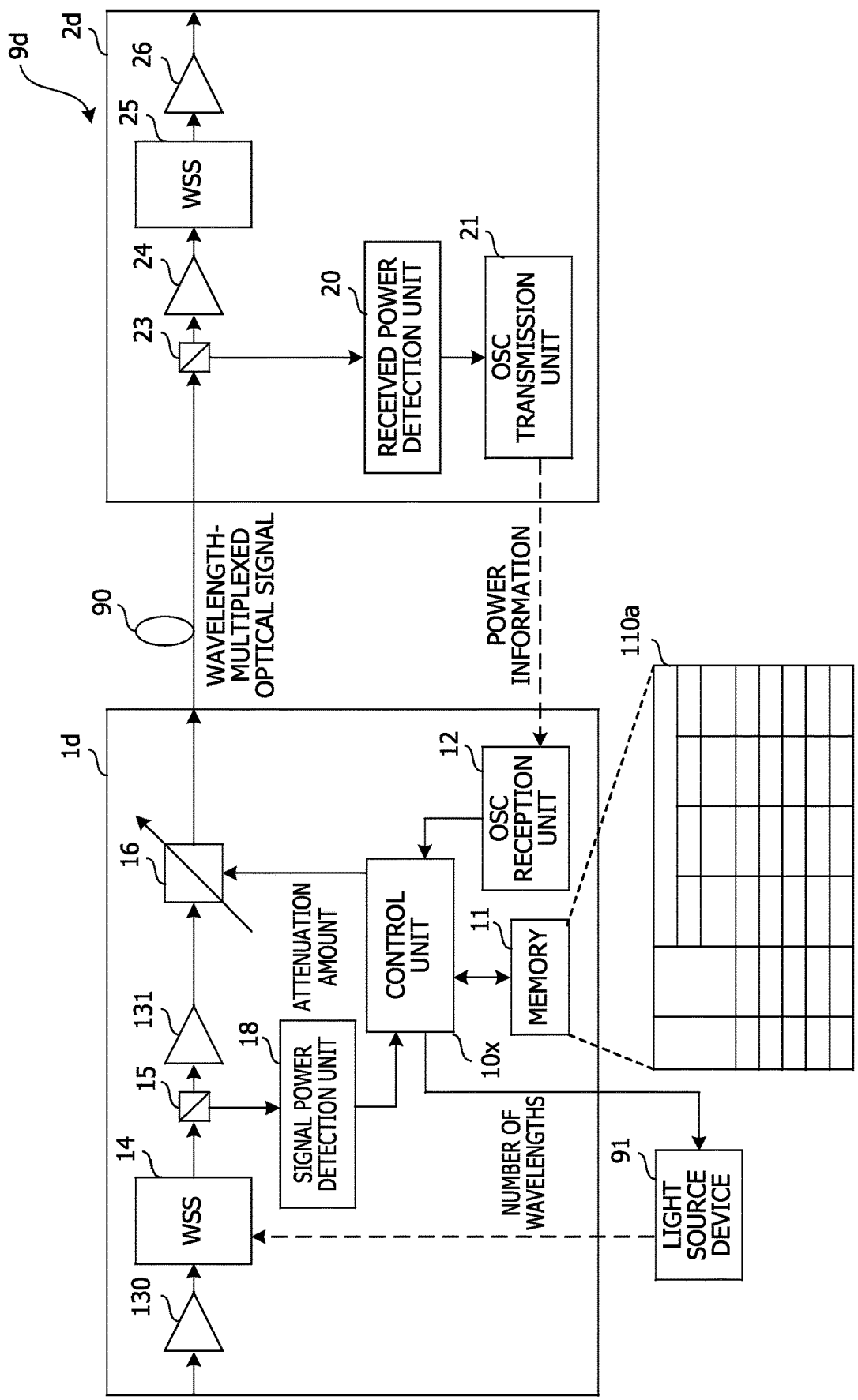
FIG. 12 is a configuration diagram illustrating a transmission system of the second embodiment (part 4)

FIG. 12 is a configuration diagram illustrating a transmission system 9d of the second embodiment. The transmission system 9d includes a transmission device 1d that transmits the wavelength-multiplexed optical signal to the transmission line 90, and a reception device 2d that receives the wavelength-multiplexed optical signal from the transmission device 1d via the transmission line 90. In FIG. 12, components common to those in FIG. 9 are denoted by the same reference signs, and descriptions thereof will be omitted.

The transmission device 1d includes the control unit 10x, the memory 11, the OSC reception unit 12, the WSS unit 14, the tap 15, and the variable optical attenuator 16. Furthermore, the transmission device 1d includes the preamplifier 130, the postamplifier 131, and the signal power detection unit 18. The reception device 2d includes the received power detection unit 20, the OSC transmission unit 21, the tap 23, the preamplifier 24, the WSS unit 25, and the postamplifier 26.

Thus, the transmission device 1d does not include the WDM coupler 17 and the forward pumping light source 19, and is different from the above-described transmission device 1a. Furthermore, the reception device 2d does not include the WDM coupler 22 and the backward pumping light source 27, and is different from the above-described reception device 2a. For example, in the transmission system 9d, the forward pumping light source 19 is removed from the transmission device 1d, and the backward pumping light source 27 is removed from the reception device 2d. Such a non-Raman configuration in which the transmission device 1d does not have the forward pumping light source 19 and the reception device 2d does not have the backward pumping light source 27 may be adopted as the Raman configuration. Note that, in FIG. 9, the non-Raman configuration is described as non-Raman.

Figure 13:
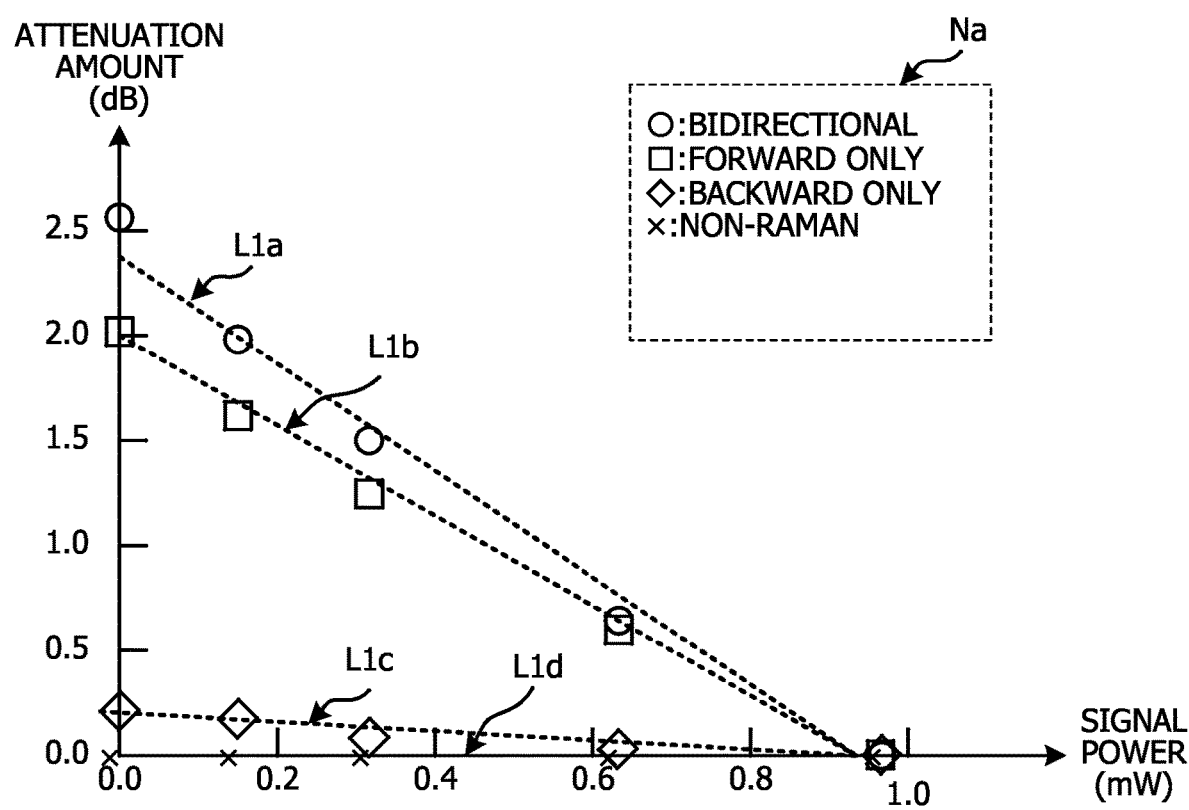
FIG. 13 is a graph illustrating an example of a relationship between signal power and the attenuation amount for each Raman configuration.

FIG. 13 is a graph illustrating an example of a relationship between the signal power and the attenuation amount for each Raman configuration. In the graph, the signal power and the attenuation amount registered in the data table 110a of the above example are plotted with individual symbols (see sign Na) for each Raman configuration.

The control unit 10x approximates the signal power and the attenuation amount of the above-described measurement result to a straight line of a linear function indicated by the dotted line, for each Raman configuration. A straight line L1a indicates characteristics of the case where the Raman configuration is the bidirectional distributed Raman configuration. A straight line L1b indicates characteristics of the case where the Raman configuration is the forward pumping Raman configuration. A straight line L1c indicates characteristics of the case where the Raman configuration is the backward pumping Raman configuration. A straight line L1d indicates characteristics of the case where the Raman configuration is the non-Raman configuration. In all of the straight lines L1a, L1b, and L1c, the attenuation amount decreases as the signal power increases, but in the straight line L1d, the attenuation amount is maintained regardless of the increase in the signal power. Note that the dotted line is omitted in the straight line L1d because the straight line L1d overlaps the horizontal axis that defines the signal power.

For example, the control unit 10x fits the relationship between the signal power and the attenuation amount of the measurement result to the above-described equation (1) before the start of operation of the transmission system 9a. The control unit 10x calculates the coefficients A and B of the straight lines L1a, L1b, L1c, and L1d and stores them in the memory 11. Here, the coefficients A and B are examples of correlation data regarding the correlation between the signal power and the attenuation amount.

For example, after the start of the operation of the transmission system 9a, the control unit 10x reads out the coefficients A and B according to the Raman configuration from the memory 11 and substitutes the coefficients A and B into the equation (1) to generate a formula of a linear function such as the equation (2). During the operation of the transmission system 9a, the control unit 10x calculates the attenuation amount from the signal power using the formula.

Thus, the control unit 10x determines the attenuation amount based on the coefficients A and B according to the Raman configuration from the signal power. Therefore, the control unit 10x calculates the attenuation amount with higher accuracy than the case of using the data table 110a. Note that the formulas used by the control unit 10x are not limited to linear functions, and may be other formulas such as quadratic functions.

Figure 14:
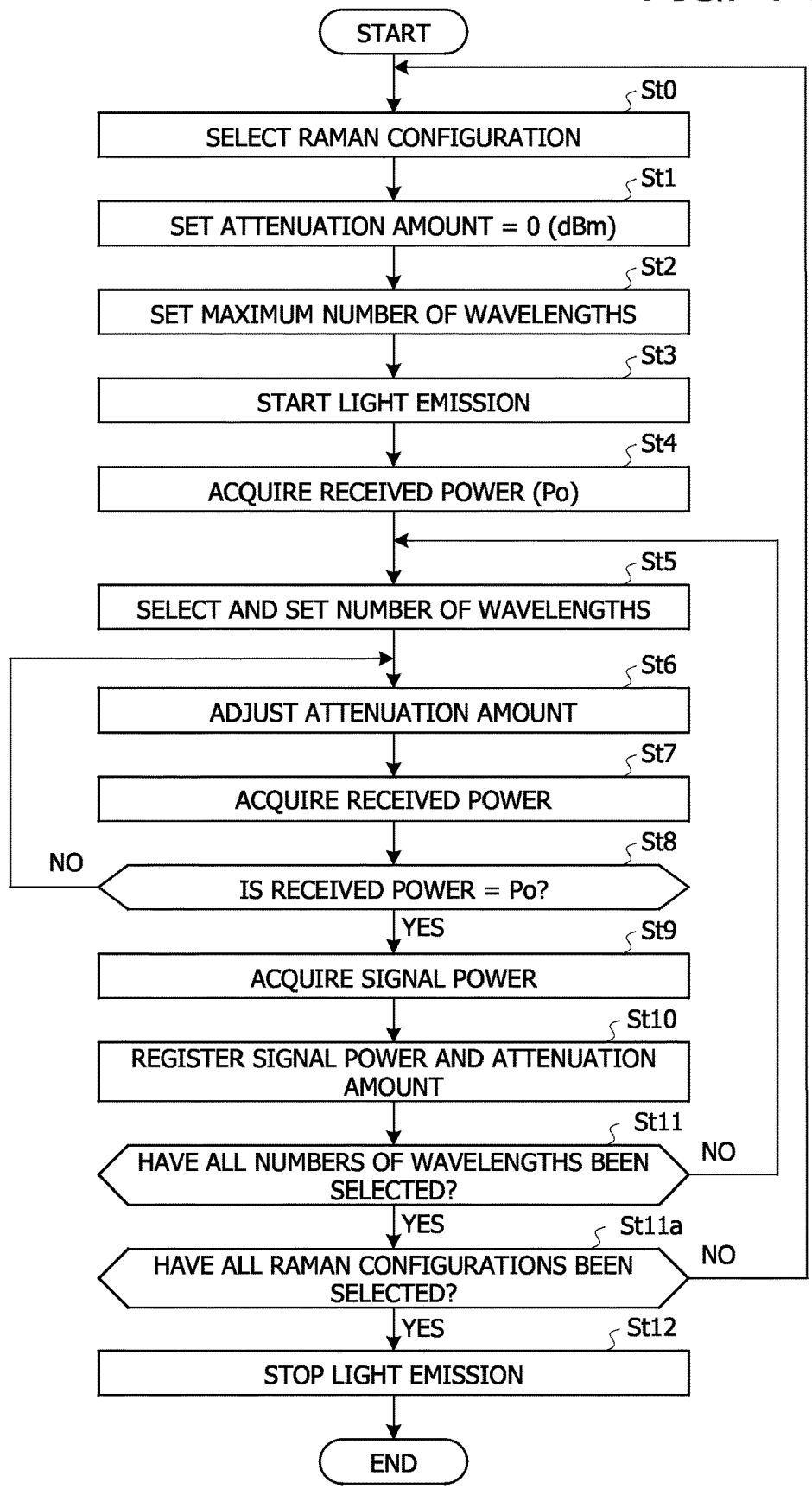
FIG. 14 is a flowchart illustrating an example of an operation of a control unit before start of operation of the transmission system of the second embodiment.

FIG. 14 is a flowchart illustrating an example of an operation of a control unit 10x before start of operation of the transmission system 9a, 9b, or the like of the second embodiment. In FIG. 14, processing common to that in FIG. 4 is denoted by the same reference sign, and descriptions thereof will be omitted.

The control unit 10x selects one of the plurality of Raman configurations set in the control unit 10x itself (operation St0). For example, the control unit 10x selects the bidirectional distributed Raman configuration based on its settings. When the bidirectional distributed Raman configuration has already been selected, the control unit 10x selects, for example, the forward pumping Raman configuration from the remaining Raman configuration. When selecting the Raman configuration, the control unit 10x executes the processing of subsequent operations St1 to St11 according to the selected Raman configuration.

In a case where all the numbers of wavelengths have been selected (Yes in operation St11), the control unit 10x determines whether all the Raman configurations have been selected (operation St11a). In a case where there is an unselected Raman configuration (No in operation St11a), the control unit 10x selects the unselected Raman configuration (operation St0) and executes each processing of operation St1 and subsequent operations again. Thereby, the correlation between the Raman configuration and the attenuation amount is registered in the data table 110a (see FIG. 9). In this manner, the operation of the control unit 10x before the start of operation of the transmission system 9a, 9b, or the like is performed.

Figure 15:
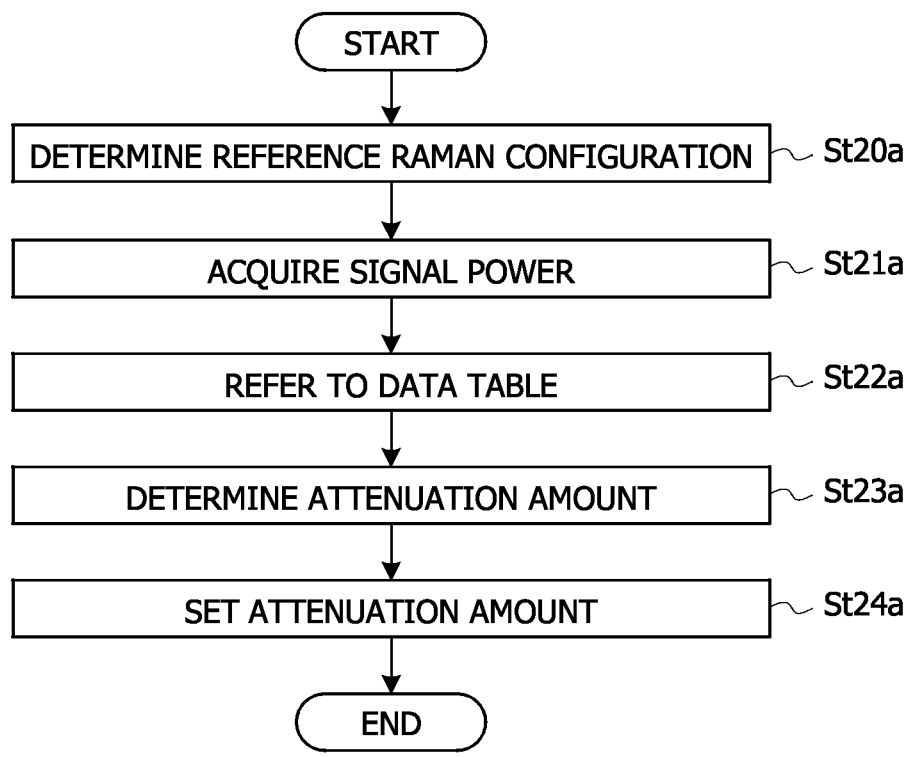
FIG. 15 is a flowchart illustrating an example of the operation of the control unit during the operation of the transmission system of the second embodiment.

FIG. 15 is a flowchart illustrating an example of the operation of the control unit 10x during the operation of the transmission system 9a, 9b, or the like of the second embodiment. In FIG. 15, processing common to that in FIG. 5 is denoted by a corresponding reference sign, and detailed description thereof will be omitted. The present operation is repeatedly executed while the transmission system 9a, 9b, or the like is in operation.

The control unit 10x receives the input of the Raman configuration and determines a reference Raman configuration that is a reference in the data table 110a (operation St20a). In the present embodiment, the reference is one of the bidirectional distributed Raman configuration, the forward pumping Raman configuration, the backward pumping Raman configuration, or the non-Raman configuration.

Next, the control unit 10x acquires the signal power from the signal power detection unit 18 (operation St21a). Next, the control unit 10x refers to the data table 110a based on the signal power (operation St22a). At this time, the control unit 10x searches for the value closest to the signal power acquired from the signal power detection unit 18 among the signal power in the data table 110a, for example.

Next, the control unit 10x determines the attenuation amount from the Raman configuration based on the data table 110a (operation St23a). At this time, the control unit 10x determines the attenuation amount corresponding to the Raman configuration retrieved from the data table 110a as the attenuation amount (control value) of the variable optical attenuator 16.

Next, the control unit 10x sets the determined attenuation amount in the variable optical attenuator 16 (operation St24a). As a result, the received power is controlled to the target value Po. In this manner, the operation of the control unit 10x during the operation of the transmission system 9a, 9b, or the like is performed.

As described above, the control unit 10x controls the attenuation amount of the variable optical attenuator 16 according to the change in the received power according to the number of wavelengths and the Raman configuration such that the received power of the wavelength-multiplexed optical signal reaches the target value, and generates the data table 110a based on the signal power and the attenuation amount of when the received power reaches the target value by controlling the attenuation amount, before the start of operation of the transmission system 9a, 9b, or the like. Furthermore, after generating the data table 110a, the control unit 10x determines the attenuation amount based on the data table 110a from the received power during the operation of the transmission system 9a, 9b, or the like.

Therefore, the transmission device 1a, 1b, or the like controls the received power to the target value so as to follow the high-speed fluctuation of the number of wavelengths of the wavelength-multiplexed optical signal, and suppresses the deterioration in the transmission quality.

Note that, in the present example, the control unit 10x uses the transmission system 9a, 9b, or the like to generate the data table 110a and store the data table in the memory 11, but the present embodiment is not limited to this. The data table 110a may be stored in the memory 11 in advance from experimental results and simulation results based on design values of the transmission system 9a, 9b, or the like. Even in this case, since the control unit uses the data table 110a stored in the memory 11, similar effects to those described above may be obtained.

Furthermore, the control unit 10x may generate a formula indicating the correlation between the Raman configuration and the attenuation amount using a similar method to that described above before the start of operation of the transmission systems 9a or 9b. In this case, the control unit stores coefficients of the formula in the memory 11, read the coefficients out during the operation of the transmission systems 9a, 9b, or the like, and use the coefficients to determine the attenuation amount.

The embodiment described above is an example of a preferred embodiment. However, they are not limited to this, and a variety of modifications may be made without departing from the gist of the present embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission apparatus comprising:
   a signal power detector configured to detect signal power of a wavelength-multiplexed optical signal to be transmitted to a transmission line;
   a variable optical attenuator configured to attenuate the wavelength-multiplexed optical signal; and
   a processor configured to control an attenuation amount of the variable optical attenuator according to the signal power and whether a Raman amplifier in which pumping light is inputted to the transmission line exists.

2. The transmission apparatus according to claim 1, further comprising:
   a memory coupled to the processor and configured to store correlation data regarding correlation among the signal power of when received power of the wavelength-multiplexed optical signal received by a reception apparatus that faces the transmission apparatus via the transmission line reaches a target value, whether the Raman amplifier exists, and the attenuation amount,
   wherein the processor determines the attenuation amount of the variable optical attenuator, based on the correlation data from the signal power.

3. The transmission apparatus according to claim 2, wherein the correlation data includes a combination of the signal power, whether the Raman amplifier exists, and the attenuation amount.

4. The transmission apparatus according to claim 2, wherein the correlation data includes a coefficient of a formula that indicates the correlation among the signal power, whether the Raman amplifier exists, and the attenuation amount.

5. The transmission apparatus according to claim 2, wherein the processor sets, as the target value, the received power of when the number of wavelengths included in the wavelength-multiplexed optical signal is maximum.

6. The transmission apparatus according to claim 2, wherein the processor decreases the attenuation amount of the variable optical attenuator according to an increase in the signal power in a case where either one or both of the transmission apparatus and the reception apparatus include the Raman amplifier.

7. The transmission apparatus according to claim 2, wherein the processor maintains the attenuation amount of the variable optical attenuator regardless of an increase in the signal power in a case where both the transmission apparatus and the reception apparatus do not include the Raman amplifier.

8. A transmission system comprising:
   a transmission apparatus configured to include
   a signal power detector configured to detect signal power of a wavelength-multiplexed optical signal to be transmitted to a transmission line,
   a variable optical attenuator configured to attenuate the wavelength-multiplexed optical signal, and
   a processor configured to control an attenuation amount of the variable optical attenuator according to the signal power and whether a Raman amplifier in which pumping light is inputted to the transmission line exists; and a reception apparatus configured to receive the wavelength-multiplexed optical signal transmitted from the transmission apparatus via the transmission line.

9. The transmission system according to claim 8, wherein the transmission apparatus includes a memory coupled to the processor and that stores correlation data regarding correlation among the signal power, whether the Raman amplifier exists, and the attenuation amount, wherein the reception apparatus includes a received power detector configured to detect received power of the wavelength-multiplexed optical signal, and a notifier configured to notify the processor of the received power, and wherein the processor controls the attenuation amount, based on a change in the signal power according to a number of wavelengths included in the wavelength-multiplexed optical signal such that the received power reaches a target value, generates the correlation data based on the signal power of when the received power reaches the target value by the controlling the attenuation amount, whether the Raman amplifier exists, and the attenuation amount, and determines the attenuation amount of the variable optical attenuator, based on the correlation data from the signal power after generation of the correlation data.

10. The transmission system according to claim 9, wherein the correlation data includes a combination of the signal power, whether the Raman amplifier exists, and the attenuation amount.

11. The transmission system according to claim 9, wherein the correlation data includes a coefficient of a formula that indicates the correlation among the signal power, whether the Raman amplifier exists, and the attenuation amount.

12. The transmission system according to claim 9, wherein the processor sets, as the target value, the received power of when the number of wavelengths included in the wavelength-multiplexed optical signal is maximum.

13. The transmission system according to claim 9, wherein the processor decreases the attenuation amount of the variable optical attenuator according to an increase in the signal power in a case where either one or both of the transmission apparatus and the reception apparatus include the Raman amplifier.

14. The transmission system according to claim 9, wherein the processor maintains the attenuation amount of the variable optical attenuator regardless of an increase in the signal power in a case where both the transmission apparatus and the reception apparatus do not include the Raman amplifier.

* * * * *